United States Patent [19]

Sadlo et al.

[11] Patent Number: 5,670,223

[45] Date of Patent: Sep. 23, 1997

[54] SUPPORT CORE RIBBON FOR COLD-SHRINK TUBE

[75] Inventors: James L. Sadlo, Round Rock; Eugene J. Melancon, Austin, both of Tex.

[73] Assignee: Minnesota Mining and Manufacturing Company, St. Paul, Minn.

[21] Appl. No.: 384,516

[22] Filed: Feb. 6, 1995

[51] Int. Cl.⁶ .................................................. F16L 11/00
[52] U.S. Cl. ........................... 428/34.9; 174/DIG. 9; 174/135; 428/35.1; 428/36.9
[58] Field of Search .................. 174/135, 84 R, 174/DIG. 8; 428/34.9, 36.9, 161, 163, 167, 35.1

[56] References Cited

U.S. PATENT DOCUMENTS

| 3,515,798 | 6/1970 | Sievert | 174/135 |
| 3,808,352 | 4/1974 | Johnson | 174/73.1 |
| 4,389,440 | 6/1983 | Keith | 428/34.9 |
| 4,503,105 | 3/1985 | Tomioka | 174/135 X |
| 4,871,599 | 10/1989 | Knorr | 174/135 X |
| 4,934,227 | 6/1990 | Knorr | 174/135 X |

FOREIGN PATENT DOCUMENTS

| 0 619 636 A1 | 4/1994 | European Pat. Off. | H02G 15/18 |
| 83-00779 | 3/1983 | WIPO | 174/DIG. 8 |

Primary Examiner—Hyung S. Sough
Attorney, Agent, or Firm—Gary L Griswold; Walter N. Kirn; Matthew B. McNut

[57] ABSTRACT

A core for a cold-shrink tubing assembly is produced from a ribbon helically wound on itself to form a cylindrical tube. The edges of the ribbon are formed to interlock with each other and are contoured to facilitate ultrasonic welding of the edges.

4 Claims, 1 Drawing Sheet

SUPPORT CORE RIBBON FOR COLD-SHRINK TUBE

FIELD OF THE INVENTION

This invention relates generally to elastomeric sleeving supported by a removable core, and particularly to construction of the core.

BACKGROUND OF THE INVENTION

U.S. Pat. No. 3,515,798, assigned to the assignee of the present invention, describes an elastomeric cover and removable core assembly which is particularly useful in the electrical distribution industry. However, the application of rubbery insulating sleeves to electric wire or cable splice areas is illustrative, and although the invention will be described primarily in terms of devices and procedures adapted particularly therefor, it is not to be construed as limited thereto, being equally applicable, for example, in the application of corrosion-preventing protective sleeves to welded pipe joints. The assembly is typically referred to as cold-shrink tubing to differentiate it from polymeric tubing which may be shrunk by the application of heat.

FIG. 1 illustrates a typical use for and construction of a cold-shrink tube assembly and shows two cable-ends 11 comprising a stranded conductor 12 and an insulating covering 13. The covering is cut away at 14 and the conductors 12 joined together in end-to-end configuration by suitable means which may typically consist of a compressed or indented metal sleeve or a close-fitting metal tube with set-screw retainers. The joint or splice may be covered with insulating mastic or tape, here omitted for clarity of illustration.

The cold-shrink tube assembly is slipped over one of the wire-ends prior to joining the two ends. After the splice is completed, the assembly is slid into position over the splice area and the support is removed to permit the elastic cover to contract and form a tight fit. The process will be apparent from the illustration. The support comprises a unitary tubular core 15 helically grooved along its entire length, the continuous groove 16 permitting the core 15 to be pulled out into a continuous strip 17 which is removed through the bore, i.e., from between the core 15 and the cable 11. An elastic tube 18 in radially extended or stretched condition is supported on the core 15. As the strip 17 is progressively withdrawn, the tube 18 contracts about the cable as at 19 to form a closely conforming and tightly retained protective covering. Contraction of the tube results in the application of a resultant force against the end of the core 15 and assists in the removal of the strip 17 as the core 15 is unwound.

Although the construction described above has been used effectively for many years, considerable effort has been invested to reduce the amount of material used for the core 15 without compromising the strength of the core 15, i. e., its ability to withstand the compressive forces imposed upon it by the elasticity of the tube 18.

One method of reducing the amount of material used in the core 15 has been to produce the core 15 from a continuous ribbon 20 such as that shown in FIGS. 2 and 3. The ribbon 20 includes edges 22 and 24 which interlock, as shown in FIG. 3, when the ribbon 20 is helically wound to form a tubular core. The interlocked edges 22 and 24 may be joined by such means as adhesives, heat welding or solvent welding, but the preferred method is ultrasonic welding. The construction of FIGS. 2 and 3 was effective to reduce the amount of material used in the core 15 since the thickness of the core tube could be reduced as it was no longer necessary to cut a groove 16 in the material to form the helical line of weakening which allowed the core 15 to be pulled as a strip 17 from the assembly. The joint between the edges 22 and 24 of the joined ribbon 20 formed the helical line of weakness around the core 15. Unfortunately, it was found that the extensive surface area of the contact between the two edges 22 and 24 of the ribbon 20 resulted in bonds at the joint surface which were difficult to control, both in terms of location and strength. As a result, the core 15 was at times too weak to support the elastomeric sleeve 18 or too strong to allow easy stripping of the core 15 from the sleeve 18.

The present invention modifies the shape of the ribbon edges 22 and 24 in order to achieve greater uniformity of bonding at the joint.

SUMMARY OF THE INVENTION

The present invention produces cold-shrink tube assembly cores having more uniform and predictable characteristics than previous constructions by manufacturing the core from a ribbon having first and second major surfaces and first and second edges and adapted to be edge joined to itself to form a helically-wound tube, the ribbon comprising a first coupling projection extending from the first major surface toward the second major surface and terminating short of the second major surface, a second coupling projection extending from the second major surface toward the first major surface and terminating short of the first major surface, recesses in the ribbon adjacent the first and the second coupling projections for accepting the projections and thus permitting the first coupling projection of one ribbon section to engage the second coupling projection of another ribbon section with the major surfaces of the ribbon sections aligned to form a smooth surface of the tube, the coupling projections being formed such that the first and the second coupling projections may engage each other along a continuous surface free of any surfaces which are perpendicular to said major surfaces.

The ribbon may further include perforations within the larger recess to alternatively or additionally increase the uniformity of the force necessary to separate the helical coils of the core when it is desired to remove the core from the sleeve.

BRIEF DESCRIPTION OF THE DRAWINGS

The present invention will be more particularly described with respect to the following drawings, wherein like numbers refer to like parts in the several views, and wherein.

DESCRIPTION OF THE PREFERRED EMBODIMENT

Figure 1:
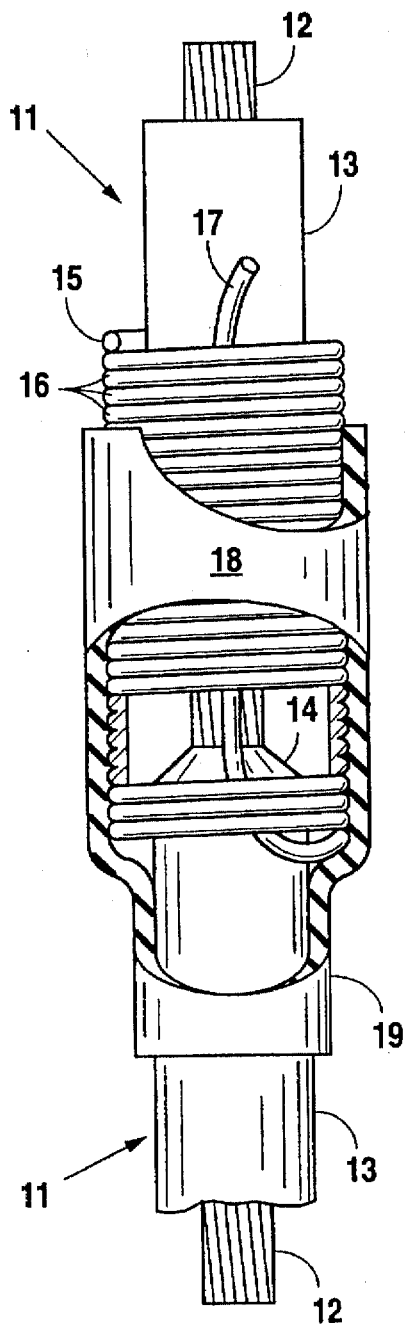
FIG. 1 is plan view, with portions in cross-section, of a cable and protective sleeve assembly of the prior art.
Figure 2:
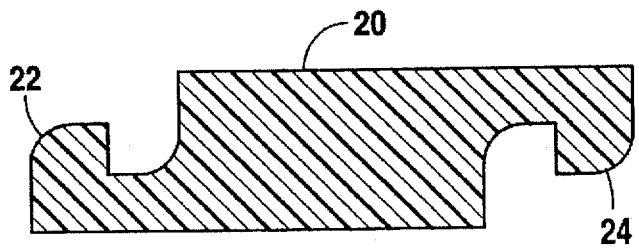
FIG. 2 is a cross-sectional view of a ribbon used to manufacture a tubular core according to the prior art.
Figure 3:
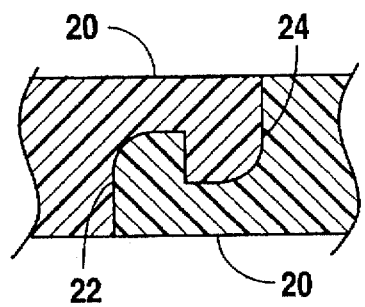
FIG. 3 is a cross-sectional view of the ribbon of FIG. 2 wound in helical fashion and edge-joined to manufacture a tubular core according to the prior art.

FIGS. 2 and 3 illustrate a ribbon 20 of the prior art from which a tubular core similar to the core 15 of FIG. 1 may be wound. The ribbon 20 includes formed edges 22 and 24 which allow one edge 22 of one longitudinal portion of the ribbon 20 to interlock with the opposite edge 24 of another longitudinal portion of the ribbon 20 so that the ribbon 20 may be helically wound to form a cylindrical tube. This tube may be used as a core to support an elastomeric sleeve of rubber or other suitable material as shown in FIG. 1.

As the ribbon 20 is helically wound, the edges are joined by a suitable method, such as by means of an adhesive, heat welding or solvent welding, but preferably ultrasonic welding, to provide sufficient strength in the finished core to support the sleeve in an expanded state. At the same time, it is desirable that the strength of the joint be sufficiently weaker than the strength of the ribbon 20 material so that the joint will separate predictably when it is desired to tear the core into a strip to effect its removal from the sleeve.

It has been found that the configuration of the edges 22 and 24 of the ribbon 20, and the resulting length of the line of contact between the mated edges, did not always allow the results of welding or bonding to be accurately predicted, either in the location of the weld along the line of contact between the halves or in the strength of the bond. In particular, it was found that the vertical surfaces associated with the construction of FIGS. 2 and 3 caused undesirable and unpredictable welding or bonding at these locations. This at times resulted in tearing of the material of the ribbon 20 rather than separation at the joint, insufficient strength to support the elastomeric sleeve or undesirably high effort necessary to separate the core into a strip for removal.

Figure 4:
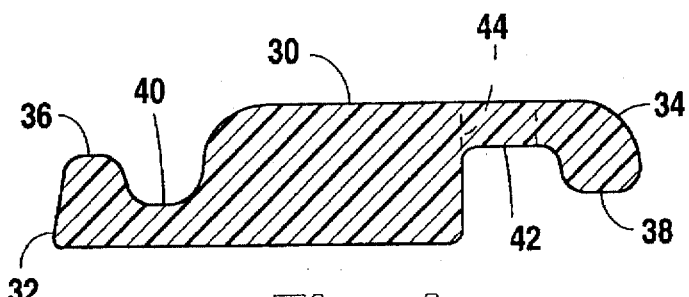
FIG. 4 is a cross-sectional view of a ribbon used to manufacture a tubular core according to the present invention.
Figure 5:
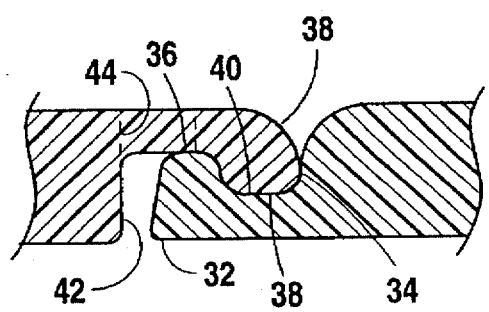
FIG. 5 is a cross-sectional view of the ribbon of FIG. 4 wound in helical fashion and edge-joined to manufacture a tubular core according to the present invention.

FIGS. 4 and 5 illustrate a ribbon 30 designed to minimize the uncertainties associated with the ribbon 20 of FIGS. 2 and 3. The ribbon 30 is of any polymeric material suitable for ultrasonic welding or other bonding techniques and possessing sufficient strength to support the sleeve. Suitable materials have been found to be polyolefins. The ribbon 30 includes asymmetrical edges 32 and 34 which are designed to provide greater control over bonding in general, and, in particular, ultrasonic welding of the ribbon edges 32 and 34 to each other. Each edge 32 and 34 includes a coupling projection 36 and 38 extending from a major surface of the ribbon 30 to a point short of the opposite major surface of the ribbon 30. Each coupling projection 36 and 38 includes a contour which results in surface contact around substantially the entirety of the projection 38 without any vertical mating surface between the projection 38 and the projection 36.

Each coupling projection 36 and 38 is received by a recess 40 and 42 which are shaped to control contact between the mated edges of the ribbon 30. At least one of the recesses 42 is preferably oversized in relation to its respective coupling projection 36 so that an open area is produced adjacent the coupling projection 36 when the coupling projection 36 is inserted in the recess 42. In this manner, the extent of contact between the coupling projections 36 and 38 and the recesses 40 and 42 is controlled, thus allowing further control over the bonding process used to join the ribbon edges 32 and 34.

As shown in FIGS. 4 and 5, the ribbon 30 may be formed with a continuous perforation 44 extending from the bottom of the larger recess 42 through the ribbon 30 to exit at the major surface of the ribbon 30. This perforation 44 may be used to control the force necessary to separate the core into a strip for removal. For example, the weld between the edges 32 and 34 of the ribbon 30 can be increased to a high strength level by appropriate selection of edge 32 and 34 contours, but the stripping force can be maintained at lower predetermined levels by proper selection of perforation size and the separation between adjacent perforations.

Although the present invention has been described with respect to only a single embodiment, many modifications will be apparent to those skilled in the art. For example, both recesses 40 and 42 may be oversized with respect to the coupling projection 36 or 38 which is to be inserted therein. Also, although only a single projection and recess is shown at each edge of the ribbon, it is possible to have more than one projection on one or both edges, with recesses separating each projection. In this manner, any number of "fingers" could lock the edges of the ribbon together.

We claim:

1. A ribbon having first and second major surfaces and first and second edges and adapted to be edge joined to itself to form a helically-wound tube, the ribbon comprising:

a first coupling projection extending from said first major surface toward said second major surface and terminating short of said second major surface;

a second coupling projection extending from said second major surface toward said first major surface and terminating short of said first major surface;

recesses in said ribbon adjacent said first and said second coupling projections for accepting said projections and thus permit said first coupling projection of one ribbon section to engage said second coupling projection of another ribbon section with the major surfaces of said ribbon sections aligned to form a smooth surface on said tube;

said coupling projections being formed such that said first and said second coupling projections engage each other along a continuous surface free of any surfaces which are perpendicular to said major surfaces, at least one of said recesses being larger than the coupling projection to be inserted therein so that an open area is provided adjacent said coupling projection when said coupling projection is inserted within said one recess.

2. A ribbon according to claim 1 further including spaced perforations extending through said ribbon at said one recess.

3. An elastic sleeve assembly comprising an elastic sleeve member supported in highly stretched condition on a hollow core formed of a ribbon having first and second major surfaces and first and second edges and adapted to be edge joined to itself to form a helically-wound tube, the ribbon comprising:

a first coupling projection extending from said first major surface toward said second major surface and terminating short of said second major surface;

a second coupling projection extending from said second major surface toward said first major surface and terminating short of said first major surface;

recesses in said ribbon adjacent said first and said second coupling projections for accepting said projections and thus permit said first coupling projection of one ribbon section to engage said second coupling projection of another ribbon section with the major surfaces of said ribbon sections aligned to form a smooth surface on said tube;

said coupling projections being formed such that said first and said second coupling projections may engage each other along a substantially continuous surface free of any surface perpendicular to said major surfaces, at least one of said recesses being larger than the coupling projection to be inserted therein so that an open area is provided adjacent said coupling projection when said coupling projection is inserted within said one recess.

4. An elastic cover assembly according to claim 3 further including spaced perforations extending through said ribbon at said one recess.

* * * * *